Aug. 7, 1951 F. S. AJERO 2,563,701

APPARATUS FOR RESURFACING PLASTIC PHONOGRAPH RECORDS OR THE LIKE

Filed March 25, 1949 6 Sheets-Sheet 1

INVENTOR.
Fortunato S. Ajero
BY
Kegan and Kegan
Attys:

INVENTOR.
Fortunato S. Ajero
BY
Kegan and Kegan
Attys.

INVENTOR.
Fortunato S. Ajero
BY
Kegan and Kegan
Attys.

Aug. 7, 1951 F. S. AJERO 2,563,701

APPARATUS FOR RESURFACING PLASTIC PHONOGRAPH RECORDS OR THE LIKE

Filed March 25, 1949 6 Sheets-Sheet 4

INVENTOR.
Fortunato S. Ajero
BY
Kegan and Kegan
Attys.

Aug. 7, 1951 F. S. AJERO 2,563,701

APPARATUS FOR RESURFACING PLASTIC PHONOGRAPH RECORDS OR THE LIKE

Filed March 25, 1949 6 Sheets-Sheet 5

INVENTOR.
Fortunato S. Ajero
BY
Kegan and Kegan
Attys.

INVENTOR.
Fortunato S. Ajero
BY
Kegan and Kegan
Attys.

Patented Aug. 7, 1951

2,563,701

UNITED STATES PATENT OFFICE 2,563,701

APPARATUS FOR RESURFACING PLASTIC PHONOGRAPH RECORDS OR THE LIKE

Fortunato S. Ajero, Chicago, Ill., assignor to Albert I. Kegan, Chicago, Ill.

Application March 25, 1949, Serial No. 83,448

16 Claims. (Cl. 18—5.3)

My invention relates generally to improvements in apparatus for resurfacing plastic phonograph records or the like by obliterating the sound track or other surface irregularities placed therein. More particularly my invention relates to apparatus which is adapted to refinish the surfaces of a plastic phonograph record or the like with the aid of a volatile solvent in which the record or the like is soluble.

A principal object of the present invention is to provide novel apparatus adapted to mechanically, and preferably automatically, resurface used plastic phonograph records by erasing the sound tracks therefrom. Broadly, the method involved comprises treating the surface to be erased with a solvent to soften the same, mechanically smoothing the surface and making it even while it is in the softened condition, and thereafter removing the solvent to harden the surface.

My invention is especially well suited to the resurfacing and reclaiming of phonograph record disks of the type used for home recording devices and office machine dictation. Such records usually are cut, molded or otherwise formed from a plastic suitable as a recording medium, such as for example polyvinyl chloride-acetate, cellulose acetate, cellulose nitrate, or ethyl cellulose. In addition, records of this type generally are thin (some being no thicker than 0.015''), and when this is the case, it is not practical to resurface the records by shaving away enough of the record to remove the sound track. If heated until the surface melts, the record will wrinkle and distort, so that heating alone will no effectively resurface the record. One suggested mode of resurfacing these plastic records comprises placing the record in a bath of heat and simultaneously spinning the record to hold it planar. This method does not completely obliterate the prior sound track, however, and the residual grooves, while small, still cause distortion of the subsequent recordings. Also, the number of times which the record may be refinished is limited, since the record distorts under repeated application of heat, while in addition the physical properties of the material are altered to the extent that a recording of high fidelity cannot be obtained. These disadvantages are obviated by the present invention.

Advantageously, I have discovered that used plastic records of this character may be quickly and efficiently reworked for reuse by apparatus comprising a scrubbing member movable relative to a surface area of the record which is to be refinished, said member having a relatively nonabrasive working surface adapted to bear against the record, and means for introducing a solvent between the working surface of the scrubbing member and the record surface. As the scrubbing member moves across the surface, which surface is softened by the action of the solvent, the sound track or other minor surface irregularities is obliterated.

This novel resurfacing apparatus is characterized by the following special features and advantages: (1) The refinishing of the record surface may be carried out in most cases at room temperature, and in no instance at a temperature which is greater than the temperature at which the plastic is stable against heat distortion; hence the record will always remain planar. (2) The resurfacing is nonabrasive in character, so that at most a negligible amount of material is removed from the record surface area being refinished; hence the record can be repeatedly resurfaced and reused without appreciably diminishing the thickness thereof. (3) Nor are the physical properties of the record material changed when the record is resurfaced using my apparatus, so that recordings of uniformly high fidelity and accuracy can be obtained following each resurfacing of the record. (4) A small quantity of solvent is sufficient to completely obliterate the sound track in the record surface, so that records can be reprocessed at small cost.

In addition, preferred embodiments of my invention, such as that shown in the drawings, are so constructed that the operator need only place the record or similar object which is to be resurfaced in the machine, pull a housing over the record, and press an electrical switch element, after which the record is automatically refinished without further attention on the part of the operator. Preferred embodiments also can be readily adjusted to resurface plastic records or the like of different compositions, varying thicknesses, and different surface areas, all without affecting the efficacy with which the record is resurfaced.

In order that my invention may be more fully disclosed, reference is had to the accompanying drawings, which illustrate one form of apparatus embodying the foregoing and such other principles, advantages, or capabilities as may be pointed out as this description proceeds, or as are inherent in the present invention.

In the drawings.

Like reference characters designate like parts in the drawings and in the description which follows.

Figure 1:
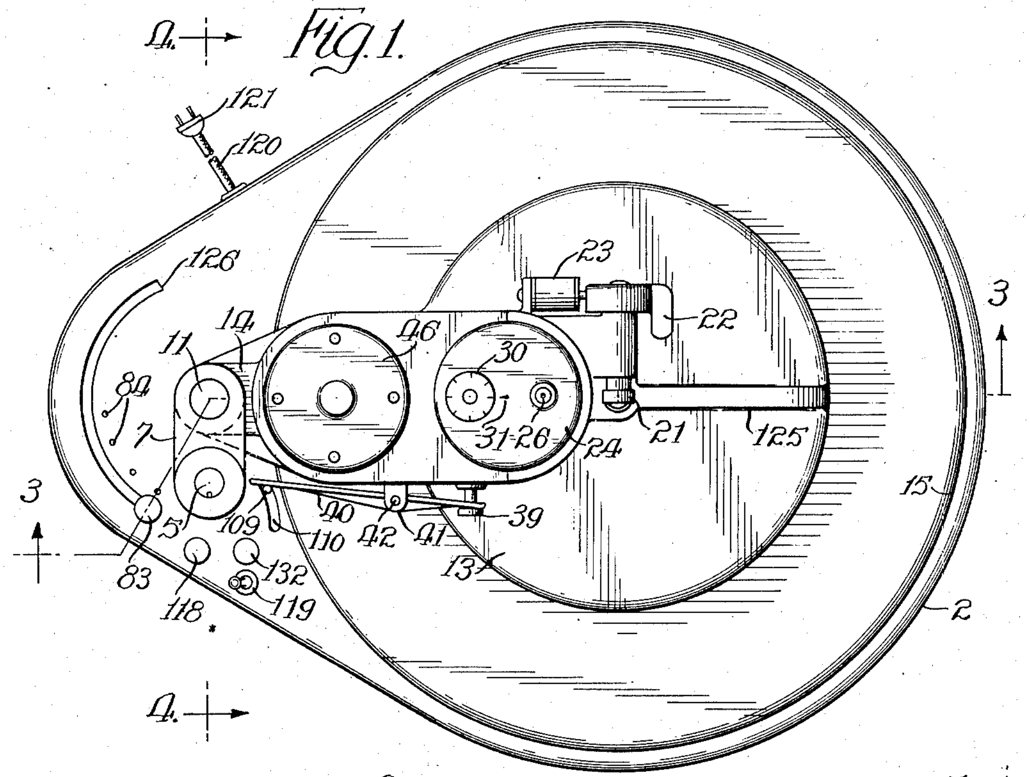
Figure 1 is a plan view of resurfacing apparatus conforming to the present invention, as it appears in the operating position.

Before proceeding with a detailed description of the construction and operation of the several parts comprising the embodiment shown in the drawings, and to better indicate the broad concepts of my invention, I describe, in brief outline below, the organization and co-action of the principal parts comprising said embodiment. More particularly, the apparatus includes (1) a platform which supports the record to be resurfaced and a housing member secured to the platform which is adapted to be swung over the record when said record is on the platform; (2) mechanism carried by the housing member, including one or more scrubber members adapted to contact the record when the housing member is in operative position, and means for driving the scrubber members to scrub the surface to be refinished; (3) means for introducing a solvent between the scrubber members and the record; and (4) mechanism adapted to integrate the actions of the foregoing elements in a timed, automatic control program.

1. *Housing and supporting members*

Figure 2:
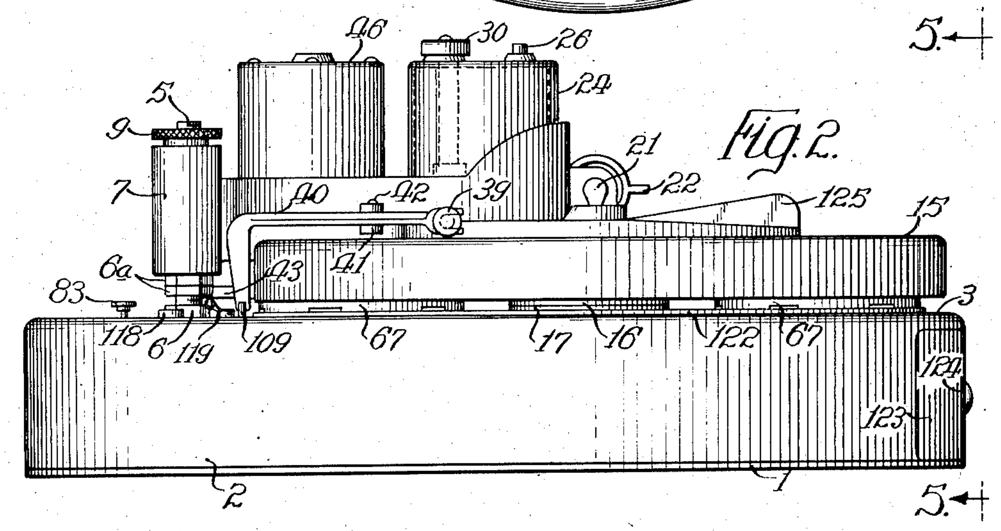
Figure 2 is a side elevational view of the same.
Figure 3:
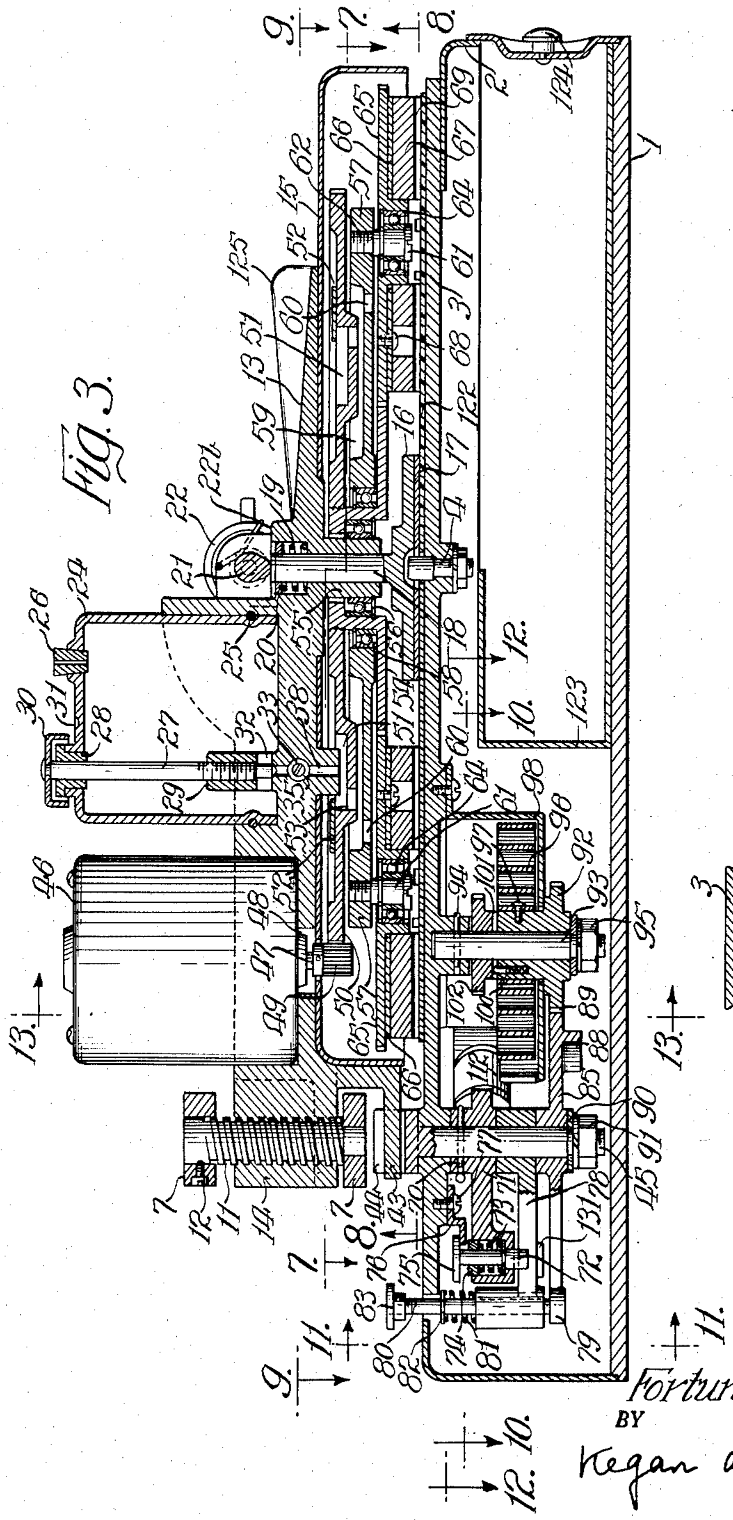
Figure 3 is a side elevational view taken substantially on the line 3—3 of Figure 1.
Figures 4, 6:
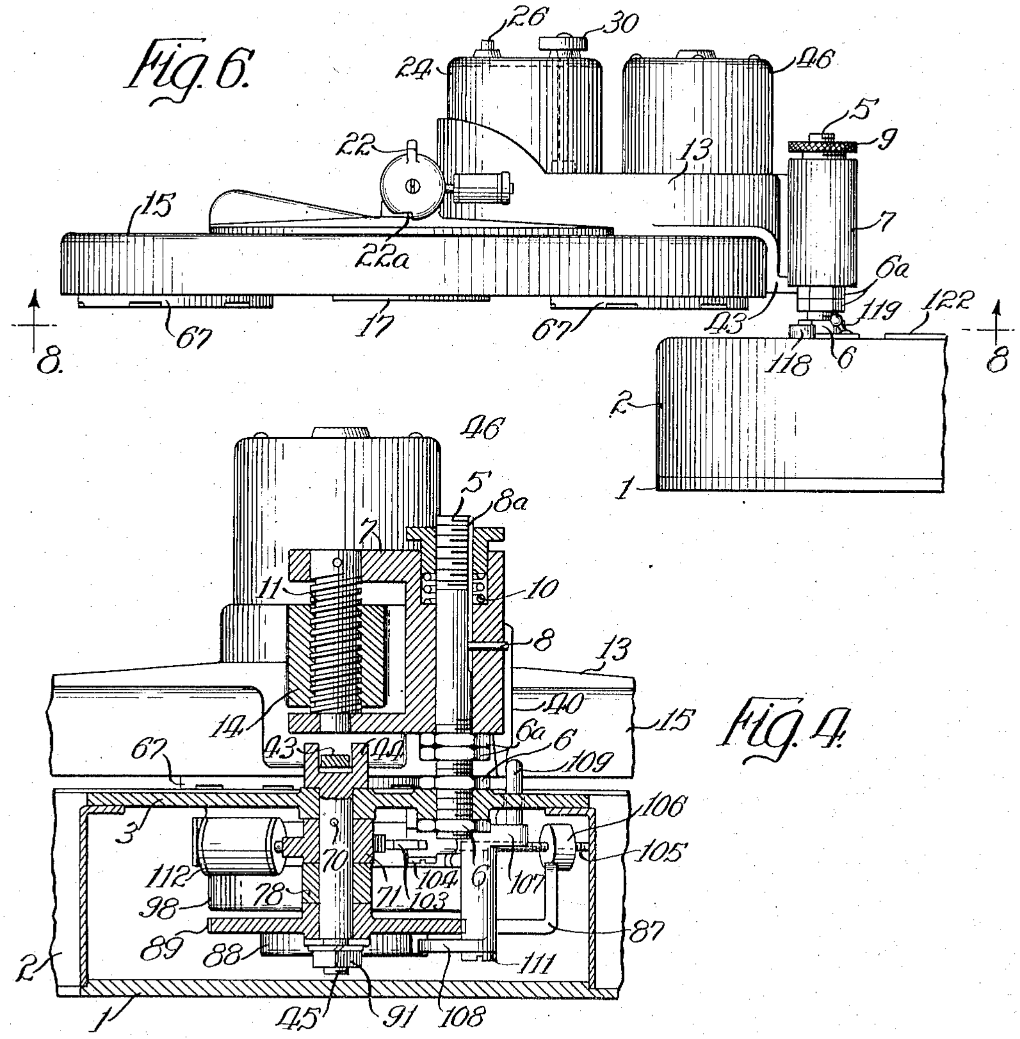
Figure 4 is a fragmentary rear elevational view taken in section on the line 4—4 of Figure 1.
Figure 6 is a fragmentary side elevational view of my invention, as it appears when swung into the loading position.

Referring now to Figures 1–3, the apparatus for supporting the record to be resurfaced is shown as including a base 1, a lower housing member 2, and a substantially level record platform 3 on which the record disk 122 is to be placed. A spindle 4 projects upwardly from the record platform 3, and is adapted to mate with the center opening conventionally present in the record disk 122. As best shown in Figure 4, a standard 5 extends vertically upward from the rearward portion of the lower housing 2, and is secured thereto by means of the mounting nuts 6, 6. A yoke 7 is mounted on the standard 5, and is adjusted as to its vertical height by the mounting nuts 6*a*, 6*a*. A key 8 and a keyway 8*a* prevent rotational movement of the yoke 7 about the standard 5, but at the same time permit the yoke 7 to move upwardly along the standard 5 against the resistance of the spring 10. The tension of the spring 10 is adjusted through the yoke retainer collar 9 threaded onto the standard 5.

Secured to the yoke 7 in the manner shown in Figure 3 is a screw threaded post 11, rotation of the post 11 being prevented by the set screw 12. Said post 11 serves as a pivot about which the mechanism support 13 swings, the support bracket 14 extending from the mechanism support 13 being bored and threaded to mate with the screw threaded post 11. As shown in the drawings, the post 11 contains a right hand thread; consequently, when the mechanism support 13 is rotated in counterclockwise from the "operative" position of Figure 1 into the "inoperative" position shown in Figure 6, said mechanism support will move vertically upward a distance equal to one-half of the lead of the thread of post 11. In this way the scrubber members referred to above may be disengaged from the surface of the disk 122 while the support 13 is being swung into the "inoperative" position.

Figure 5:
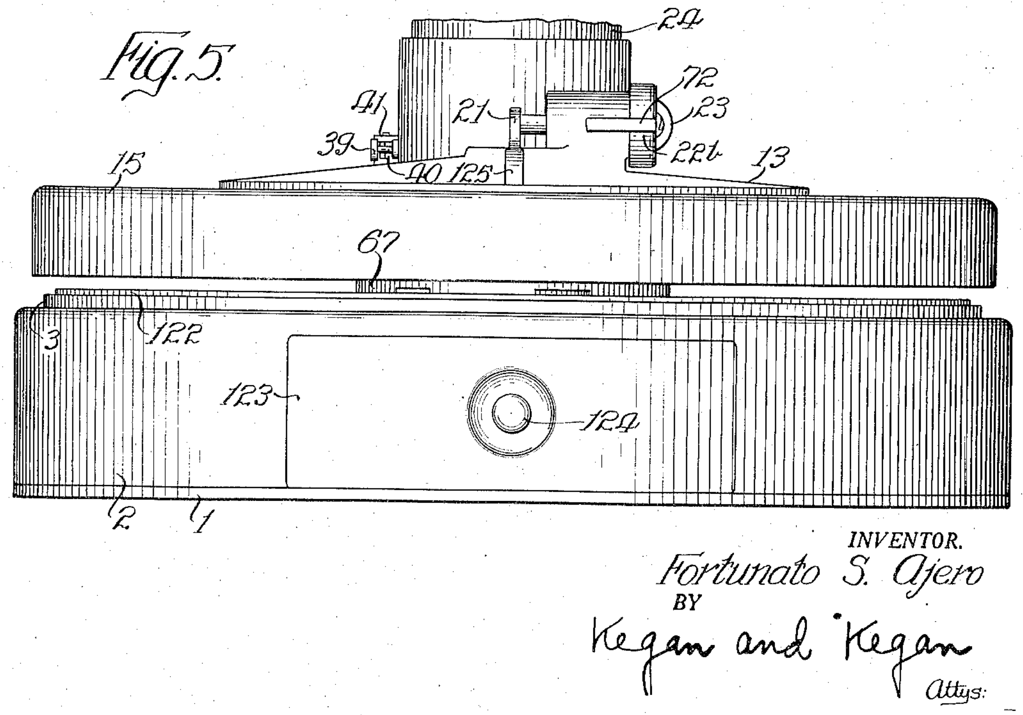
Figure 5 is a fragmentary front elevational view of the apparatus of Figure 1.

Referring now to Figure 3, a gear housing or shield 15 extends downwardly from the mechanism support 13. Concentric with the gear housing 15, and in axial alignment with the record spindle 4 when the mechanism support 13 is in the "operative" position shown in Figure 1, is a record clamping member 16, the purpose of which is to assist in holding the disk 122 stationary while being resurfaced. To this end, the member 16 includes a face plate 17 recessed at the central portion thereof to clear the record spindle 4, and a vertical shaft 18 journaled within the hub 55. A collar 20 secured to the upper end of the shaft 18 is urged upwardly by the spring 19, so that the member 16 is normally held in the "up" position. A cam 21 contacts the shaft 18 and is adapted to move the member 16 into the "down" position when the cam actuator 22 is turned from the position shown in Figure 6 to that shown in Figures 3 and 5. When the cam actuator 22 is in the latter position, the cam locking notch 22*a* is engaged by the cam release solenoid 23. The solenoid 23 is spring loaded to move automatically into engagement with the notch 22*a*, and locks the clamping member 16 in the "down" position, against both the resistance of the spring 19 and the cam return spring 22*b*.

Extending rearwardly from the mechanism support 13, and directly beneath the threaded post 11, is a yoke drive arm 43. The arm 43 is drivably connected by a tongue-and-groove arrangement to a lug yoke 44, which in turn is drivably connected to a lug yoke shaft 45. The utility of the lug yoke shaft 45 as a means for energizing desirable control functions, will become more apparent as this exposition proceeds.

The specific construction shown leaves space beneath the record platform 3 which may be utilized to advantage, as for example by providing a drawer 123 which may be pulled out by means of the knob 124, and which is useful as a means for storing tools, spare parts, and the like.

2. *Drive mechanism*

Figure 7:
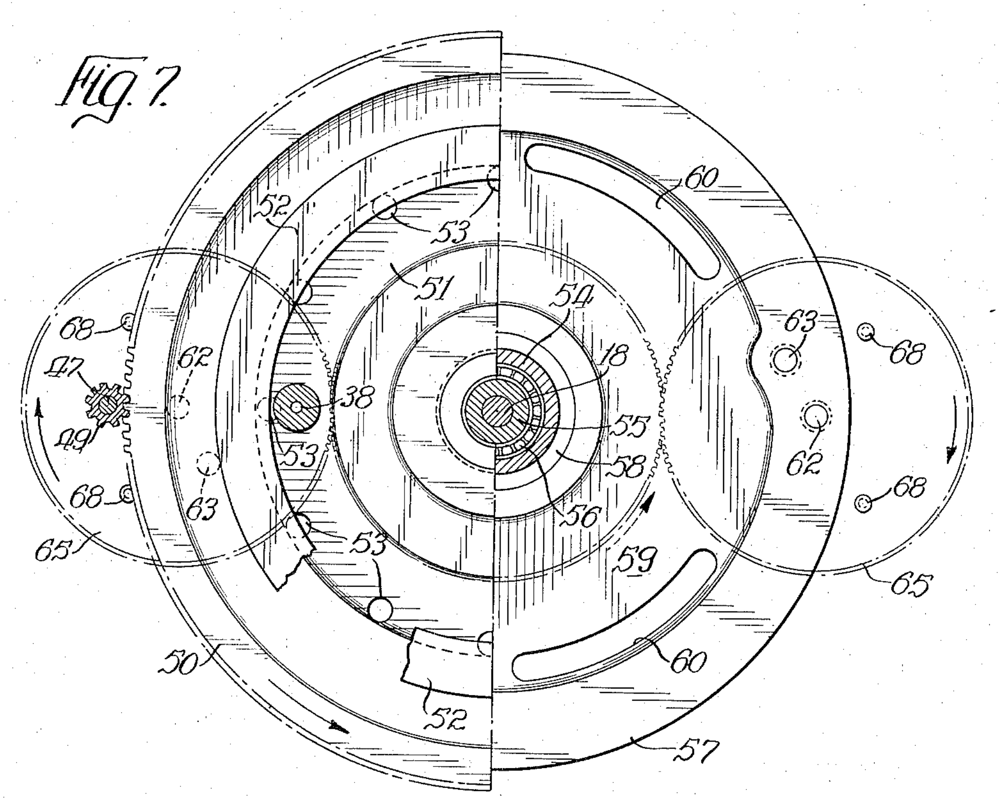
Figure 7 is a fragmentary plan view taken in section on the line 7—7 of Figure 3.

A drive motor 46 serving as the means for driving the scrubber members is carried by the mechanism support 13, and is mounted so that the motor drive shaft 47 projects downwardly through the opening 48 in the mechanism support 13 and the gear housing 15, in the manner shown in Figure 3. Carried at the outward end of the shaft 47 is a drive gear 49, which drives the main driven gear 50 rotatably mounted on the hub 55 by means of the ball-bearing assembly 56. Referring to Figure 7, the main driven gear 50 includes an annular groove 51 formed therein which acts as a fluid channel into which solvent is discharged from the valve outlet 38. The groove 51 includes a plurality of outlet ports 53 through which the solvent may drain to mechanism placed beneath the gear 50, and eventually to the record surface which is to be refinished. A splash shield 52 is secured to the main driven gear 50 and prevents the fluid from centrifuging out of the annular groove 51 when the gear 50 is rotating. A secondary gear 54 is drivably connected to and concentric with the main driven gear 50.

Directly beneath and concentric with the main driven gear 50, is a scrubber bracket disk 57. The disk 57 is journaled to the hub portion connecting the gears 50 and 54, by the ball bearing assembly 58, and accordingly is freely rotatable thereabout. The disk 57 is further characterized by an annular groove 59 formed therein which collects the solvent draining from the outlet ports 53 in the annular groove 51. The annular groove 59 in turn includes a plurality of fluid distributing slots 60, arranged in the manner shown in Figure 7.

Figures 8, 15, 16:
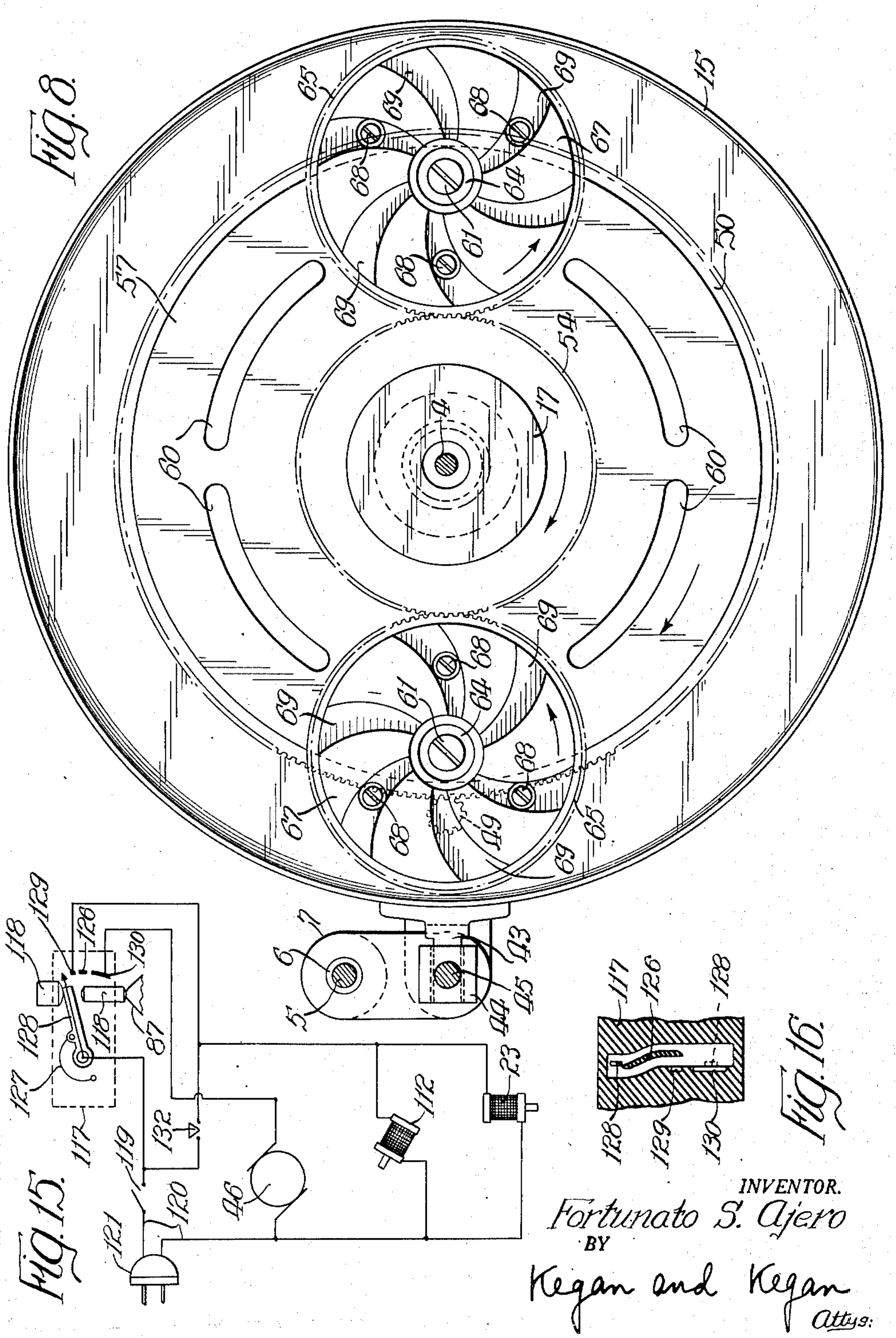
Figure 8 is a fragmentary bottom view taken in section on the line 8—8 of Figure 6.
Figure 15 is a schematic wiring diagram of the electrical elements forming part of the embodiment of Figure 1.
Figure 16 is a fragmentary cross-sectional view taken through the switch 117, showing in somewhat diagrammatic form the arrangement of some of the electrical elements thereof.

Secured to the bracket disk 57 near the periphery thereof, is a pair of diametrically opposed scrubber bearing bolts 61, 61, said bolts being threaded into the internally threaded holes 62. A ball bearing assembly 64 is carried by each of the scrubber retainer bolts 61, and provides rotational support for the scrubber gears 65, 65, each of the gears 65 being in mesh with and driven by the secondary gear 54. An annular ring or scrubber plate 66 is secured to the underside of each of the scrubber gears 65, 65. Two scrubbers 67, 67 are secured to the scrubber plates 66, 66, respectively, by means of the fasteners 68 (Figure 8). As further shown in this figure, each of the scrubbers 67, 67 is provided with a plurality of grooves 69 emanating in spiral fashion from the scrubber bearing bolt 61, and skewed in the direction in which the scrubber 67 is intended to rotate.

Scrubbers 67 should be made of material selected with special reference to the physical properties of the record and the solvent being used, and in general should have a relatively high kinetic coefficient of sliding friction when rubbed across the record wetted with solvent, yet be relatively nonabrasive. In some instances, superior results are achieved using a porous or absorbent material such as for example chamois, sponge rubber, felt or closely-woven cloth. In other instances rubber, leather or some synthetic resins advantageously may be employed. In any case, the material selected should be substantially insoluble in, and chemically inert toward the solvent. When the working surface of the scrubbers 67 is composed of a material having the foregoing characteristics, the erasure of the sound track is rapid and thorough. Advantageously, when a scrubber 67 is worn or is to be replaced for any other reason, it can quickly be detached from the gear 65 upon removal of the fasteners 68.

As is shown in Figure 7, an alternate pair of mounting holes 63 are provided, and permit the installation of scrubbers 67, 67 having a different axis of rotation. In this way records of different sizes can be reprocessed using the same equipment. It will be obvious that when this alternate set of mounting holes is employed, that the scrubber gears 65, 65 will be of smaller diameter than are the gears 65, 65 illustrated in the drawings.

3. *Solvent storage and flow control elements*

The mechanism support 13 may also serve as a support for a container in which a supply of solvent is kept, along with suitable means for feeding a quantity of the solvent to the record to be resurfaced. In the embodiment shown in the drawings, the container for solvent takes the form of a reservoir 24 adapted to store and dispense liquid solvents of the type which act to soften the surface of the records which are to be treated using my apparatus. A reservoir seal 25 is provided to prevent leakage of the solvent from the reservoir 24, while an air vent filler plug 26 is provided so that the supply of solvent within the reservoir 26 may be replenished. As best shown in Figures 1 and 3, the reservoir 24 is provided with an adjustable needle valve 27, including a valve retainer cap 28, a valve journal 29, and a valve control knob 30. A knob position indicator 31 permits the operator to regulate the rate of feed of solvent, by appropriate setting of the needle valve 27. When the apparatus is set in the position shown in Figure 9, the solvent drains from the reservoir 25 through the adjustable valve inlet 32, past the shutoff control valve 33, and is discharged through the valve outlet 38, to which reference was made previously. The control valve 33 is slidable within the valve bore 35 and is spring loaded by the valve spring 34 contained between a valve spring retainer 36 and the blind end of the hole 37. A flange 39 on the outer end of the valve 33 retains the yoked end of the lever 40, which lever 40 is pivotably secured to the bracket 41 by the pivot pin 42 (Figure 2) and which engages the pin 109 forming a part of the control mechanism.

4. *Control mechanism*

Since my invention is especially well suited to the erasure of dictating record disks used in business offices, it is desirable that the erasing apparatus be so constructed as to insure a uniform, efficient erasure of each record even though the operator has had only a cursory training in the use of the machine. For this reason I prefer to adapt my invention to a fully or semi-automatic operation. A variety of control mechanisms which will serve to carry out a control program such as that briefly mentioned above, and further enumerated hereafter, will suggest themselves to those skilled in the art. Therefore, while the particular control mechanism shown in the drawings has proven accurate and reliable, the invention is neither limited to the particular construction shown or the precise control program to which it is adapted.

In brief outline, the control mechanism shown comprises (*a*) a rotatable member which moves with the mechanism support 13 and which locks said support 13 in the "operative" position, (*b*) an arm which is driven by the rotatable member thru an arc of predetermined length, and then is disengaged therefrom, (*c*) timer mechanism energized by the arm in accordance with the length of the arc through which it displaces, and (*d*) means actuated by the timer mechanism after a predetermined time interval which unlocks the support 13 and permits same to return to the "inoperative" position.

Figures 10, 12, 14:
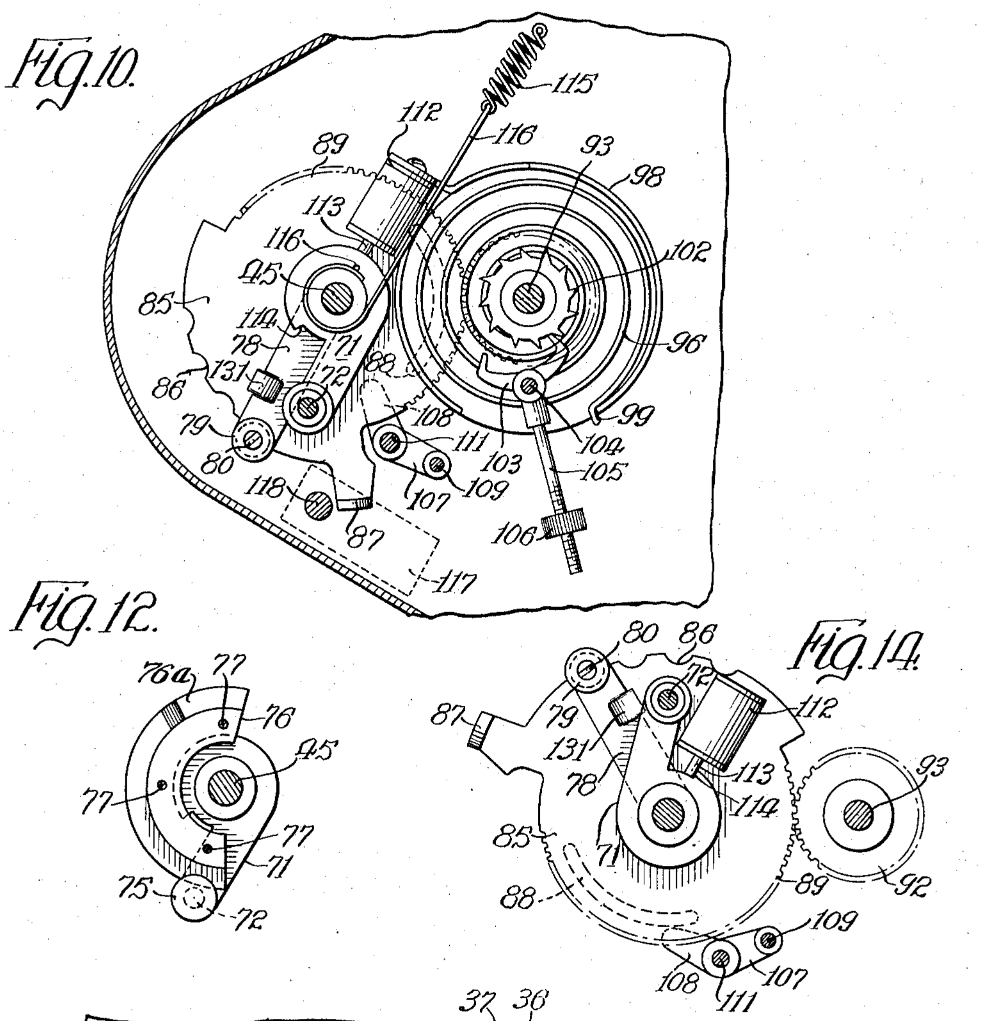
Figure 10 is a plan elevational view taken in section on the line 10—10 of Figure 3.
Figure 12 is a fragmentary plan view taken in section on the line 12—12 of Figure 3.
Figure 14 is a fragmentary plan view showing the positions of several of the elements of Figure 10 during one phase of the control sequence.

As mentioned previously, rotation of the mechanism support 13 about the screw threaded post 11 is reflected by a similar rotation by the lug yoke shaft 45. As shown in Figure 3, a lug yoke drive pin 70 secures the timing control master arm 71 to the shaft 45. Also rotatably mounted on the shaft 45, but not pinned or keyed thereto, is a slave arm 78. Figure 3, taken in conjunction with Figure 10, shows the master arm 71 as carrying a pusher pin 72 at the eccentric end thereof, the pin 72 normally being held in the "down" position by the spring 73 retained by the spring retainer 74. Clockwise rotation of the master arm 72 from the position shown in Figure 10 therefore, causes the slave arm 78 to move similarly, through the action of the pusher pin 72.

A timing disk is also rotatable about the shaft 45, being retained thereon by the thrust washer 90 and the retainer nut 91. The timing disk 85 is provided with gear teeth 89 along a portion of its periphery, while another portion of the periphery of the disk 85 includes a plurality of arcuate notches 86, each of which is adapted to receive and detain the slave arm drive lug 79. Thus, in the position shown in Figure 10, the timing disk 85 is directly connected to and rotatable with the slave timing arm 78.

To disengage the drive lug 79 from one of the notches 86 and reengage it with another one of the notches 86, and thereby alter the angular position of the slave arm 78 relative to the timing disk 85, the operator pressses down upon the lug release knob 83, to cause the lug shaft 80 to move downwardly against the resistance of the spring 81. The operator then swings the slave arm 78 to the desired position, referring to the knob position marks 84 along the arcuate slot 126 (Figure 1) and releases the knob 83 at the desired position. The compressed spring 81, acting upon the retainer 82, then moves the drive lug 79 into driving connection with the timing disk 85.

In this way the operator can vary the angle through which the mechanism support 13 and the shaft 45 must rotate before the master arm 71 engages the slave arm 78, and thus in turn vary the angle through which the timing disk 85 rotates each time the mechanism support 13 is swung into the "operative" position.

As the timing disk 85 commences to rotate, the cam 88 contacts the drive arm 108 and rotates it counterclockwise, as viewed in Figure 10. The drive arm 108 is rotatably mounted on the drive arm mounting bolt 111 (Figure 4), and is drivably connected to the drive arm 107, so that the drive arm pin 109, which extends through the slot 110 (Figure 9) is moved to the "operative" position. As mentioned previously, the pin 109 is adapted to engage the control lever 40 connected to the solvent control valve 33. But until the mechanism support 13 has been swung into the position of Figure 9 there is no engagement between the pin 109 and the lever 40; hence until this position is reached, the spring 34 holds the control valve 33 in the closed or "inoperative" position.

Figure 13:
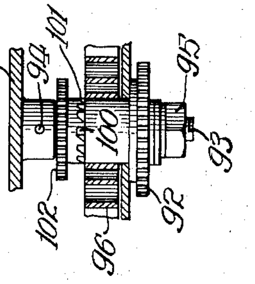
Figure 13 is a fragmentary rear elevational view taken on the line 13—13 of Figure 3.

At the same time, rotation of the timing disk 85 drives the spring winding gear 92 about the shaft 93. In this way, the clock spring 96 forming part of the timer mechanism is wound, since rotation of the spring winding gear 92 turns the winder pin 97, which fastens the inner end of the spring 96 to the hub of the gear 92. The outer end of end 99 of the spring 96 is anchored to the stationary spring housing 98. As is best shown in Figures 3 and 13, the shaft 93 is keyed to the lower housing 2 by the pin 94, while the entire spring winding assemblage is held upon the shaft 93 by the retainer nut 95. The hub of the gear 92 also includes a ratchet drive pin 100 adapted to engage the winding ratchet 101 formed in the hub of the escapement drive gear 102.

As is best shown in Figure 10, a suitable escapement mechanism controls the speed with which the energy of the spring 96 is converted into a rotational motion at the gear 92. Said escapement mechanism includes, besides the drive gear 102, a double palleted arm 103 adapted to oscillate about the retainer bolt 104 (Figure 4), while the pendulum bob 106 adjustable along the pendulum arm 105 provides means for adjusting the natural frequency of the escapement mechanism.

As the timing disc 85 is moved from the position shown in Figure 10, the switch arm 87 contacts the lower portion of the switch lug 118 (Figures 10 and 15). Normally, the switch lug 118 will already have been moved into the position shown in Figure 15; hence movement of the switch arm 87 therebeneath has no electrical effect upon the apparatus. After the master arm 71 has rotated through approximately 135 degrees, at which point the timing disk 85 is in the position shown in Figure 14, the flanged end 75 of the pusher pin 72 contacts and is moved upwardly by the rise portion 76*a* of the lifter cam 76 (Figure 12), secured to the lower housing tube by means of the fasteners 77 (Figure 3). In this way the pusher pin 72 is disengaged from the slave arm 78; however the master arm 71 continues to rotate until the position of Figure 41 is reached, whereupon the locking notch 114 is engaged by the armature 113 of the spring loaded release solenoid 112. It will be further observed that as the shaft 45 turns, it tensions the spring 115 through the connecting cord 116, so that the master arm 71, which is directly connected to the mechanism support 13, is locked in this position under spring tension.

*Operation of apparatus*

The application and advantages of my invention will be more fully realized upon considering the following description of one full cycle of operation of the embodiment shown in the drawings.

Initially, the mechanism support 13 is in the position shown in Figure 6, so that the operator can easily place a record 122 upon the record spindle 4 on the platform 3. After placing the record 122 in the machine, the operator grasps the tiller 125 and swings the mechanism support 13 into the position shown in Figure 1. In swinging the mechanism support 13 into place, the entire support translates downwardly, because of the characteristics, specified above, of the threaded post 11. As the mechanism support 13 moves downwardly, the scrubbers 67, 67 are brought into contact under pressure with the record surface containing the sound track, the mounting nuts 6*a*, 6*a* being adjusted so that the support bracket 14 is translated upwardly along the standard 5 a short distance. The exact degree of pressure between the scrubbers 67, 67 and the record 122 can be accurately adjusted by turning the yoke retainer collar 9 to vary the tension of the spring 10.

As the mechanism support 13 is brought to the position of Figure 1, the operator presses down upon the cam actuator 22, to clamp the face plate 17 of the clamp 16 upon the record 122, and thus prevent turning of said record during the subsequent processing operations.

As described above, as the mechanism support 13 rotates into this position, the master arm 71 rotates to the position shown in Figure 14, and in doing so drives the timing disk 85 (through the slave arm 78) to the position shown in this same figure. Upon completion of the foregoing steps, therefore, the clamp 16 is locked in place, while the master 71 is locked in place so that the mechanism support 13 cannot move from the position of Figure 1.

The operator next closes the power switch 119, if not already closed, to connect the electrical elements to the line through the power leads 120 and the plug 121. The switch lug 118 is then depressed, and since the switch arm 128 of the switch 117 is initially in the "up" position shown in Figure 16, depression of the lug 118 causes the switch arm 128 to move downwardly along the cam 126 so as to by-pass the momentary contact 129, and into engagement with the contact 130, whereupon the drive motor 46 is energized and commences to rotate. An over-center spring 127 is connected to the switch arm 128, so that the switch lug 118 is held in the "down" position and the drive motor 46 continues to operate.

By by-passing the momentary contact 129 upon downward movement of the switch arm 128, the circuits leading to the solenoids 23 and 112 remain open, so that the clamping member 16 and the master arm 71 remain locked in place.

In effect, the drive mechanism forming a portion of the embodiment shown in the drawings comprises a modified epicycloid gear train, in which the surface of the record 122 acts as the fixed gear or stationary member. As the drive motor 46 rotates, the main gear 50 drives the secondary drive gear 54, which in turn causes the two scrubbers 67, 67 to rotate about the scrubber bearing bolts 61, 61. If the main gear 50 and the secondary gear 54 rotate in a counterclockwise direction (Figure 7), each of the scrubbers 67, 67 will of course rotate in a clockwise direction about its respective bearing bolt 61. As each of the scrubbers 67 rubs against the record 122, the resultant force of the reactive forces opposing rotation of the scrubber 67 causes the latter and the bracket disk 57 to rotate about the hub 55 in a counterclockwise direction. The particular rate at which the bracket disk 57 rotates, will largely depend, in any given installation, upon the pressure between the scrubbers 67, 67 and the record 122, and the type of material from which the scrubbers 67, 67 are made. As was noted before, the pressure can be regulated through adjustment of the collar 9 along the standard 5, thereby varying the spring loading between the mechanism support 13 and the standard 5. In any event, the rate of rotation of the disk 57 will be very much less than the rate of rotation of the scrubbers 67, 67 about their own axes. Because there are two scrubbers 67, for each complete revolution of the bracket disk 57, each portion of the sound track in the record 122 will be contacted twice by the scrubbing devices. Where more than two scrubbers 67 are used, then of course the record surface will be contacted a correspondingly greater number of times for each revolution of the bracket disk 57.

As described previously, when the apparatus is in the operating position, the supply line from the reservoir 46 is open to the fullest extent, for any given setting of the needle valve 27, so that there is a steady flow of the solvent from the valve outlet 38 into the annular groove 51. As the disk 57 revolves about the hub 55 slowly, the solvent is therefore discharged through the slots 60 onto the record 122, in front of the approaching scrubbers 67, 67. Because of the spiral grooves 69 (Figure 8) formed in the working surface of each of the scrubbers 67, 67, the tendency of the solvent to centrifuge out and away from the rotating scrubbers 67, 67 is counteracted. As a result, substantially all of the solvent is trapped between the scrubbers 67, 67 and the record 122, where it can be most effectively utilized.

As the record 122 is being scrubbed, the spring winding gear 92 is driven in a clockwise direction (Figure 14) at a regulated rate, due to the timing action of the coiled spring 96 in combination with the escapement mechanism. The spring winding gear 92 is meshed with the gear teeth 89 of the timing disk 85, and therefore rotates the timing disk 85 and the slave timing arm 78 in a counterclockwise direction. Approximately 35 degrees before the timing disk 85 reaches the position of Figure 10, the cam 88 commences to disengage from the drive arm 108, permitting the drive arm pin 109 to swing in a clockwise direction about the mounting bolt 111. As a result, the shut-off control valve 33 (Figure 9) commences to close under the action of the spring 34, so that the flow of the solvent from the reservoir 24 to the discharge port 38 is reduced. This flow stops completely approximately 15 degrees before the timing disk 85 reaches the position of Figure 10. As the disk 85 continues to turn, however, the motor 46 also continues to revolve since it is still energized; hence the scrubbers 67, 67 continue to turn and to buff and smooth the surface of the record 122 which is being resurfaced.

Approximately 10 degrees before the disk 85 reaches the position of Figure 10, the switch arm 87 contacts the lower portion of the switch lug 118 (Figure 15). Since the operator previously depressed the upper portion of the switch lug 118, said lug is in the "down" position just prior to the time that the switch arm 87 contacts it. The latter action results in the lug 118 moving upward to the "up" position, where it remains because of the locking action of the overcenter spring 127. As the switch arm 128 moves upward, it first disengages from the switch contact 130, thereby breaking the circuit to the drive motor 46. Continuing upward, the switch arm 128 contacts the momentary switch contact 129, to momentarily ground the solenoids 23 and 112.

As the solenoid 23 is energized, it disengages from the notch 22a (Figure 6) and as a result the spring loaded cam actuator 22 is free to rotate into the position shown in this figure. Since the record clamping member 16 is spring loaded to move upwardly when the cam actuator 22 is swung into this latter position, it follows that the face plate 17 disengages from the record 122. At the same time, energizing the solenoid 112 results in the armature 113 being disengaged from the locking notch 114 (Figure 14). This releases the master arm 71 and permits it to rotate in a counterclockwise direction under the influence of the spring 115. As the arm 71 is rotated, it drives the mechanism support 13 in the same rotational direction to the position shown in Figure 6. As the master arm 71 moves toward and into contact with the slave arm 78, the pusher pin 72, which now is in the "down" position since it has moved off of the rise portion 76a of the lifter cam 76, contacts the pusher pin return cam 131, which enables the master arm 71 to move past the slave arm 78 into the null or "inoperative" position shown in Figure 10.

Therefore, and as a result of the foregoing control sequences, the mechanism support 13 automatically is swung away from the reprocessed record 122, and the operator need only remove the reconditioned record and replace it with another record to be erased. The operator then swings the mechanism support 13 back to the position shown in Figure 3, locks the clamping member 16 in place, and presses the switch lug 118 and the resurfacing operation repeats itself.

Figure 9:
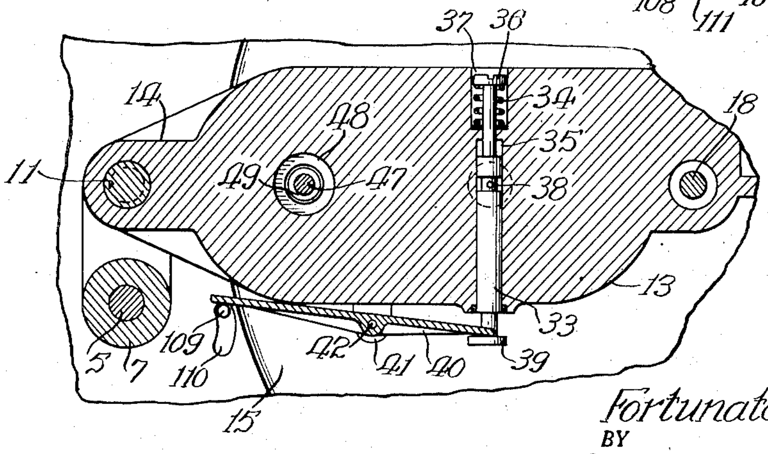
Figure 9 is a fragmentary plan view taken in section on the line 9—9 of Figure 3.

If, however, for any reason the operator should desire that the mechanism support 13 be swung away from the record 122 prior to completion of the automatic control sequences carried out by the control mechanism of Figure 10, he need only depress the momentary release switch 132 (Figures 1 and 15). This acts to ground the solenoids 23 and 122 through a circuit shunted across the switch 117, so that the clamping member 16 disengages from the record 122, while the armature 113 of the solenoid 122 disengages from the notch 114. At the same time, as the mechanism support 13 moves toward the position of Figure 6, the control valve 33 automatically shuts off, to stop further flow of the solvent, since the rotation of the mechanism support 13 swings the free end of the control lever 40 away from the drive arm pin 109 (Figure 9). In this case, the disk 85 will continue to rotate toward and into the position shown in Figure 10. However, as the switch arm 87 contacts the switch lug 118, and moves it into the "up" position, the resultant momentary energizing of the solenoids 23 and 112 will have no effect upon the action of the apparatus.

Figure 11:
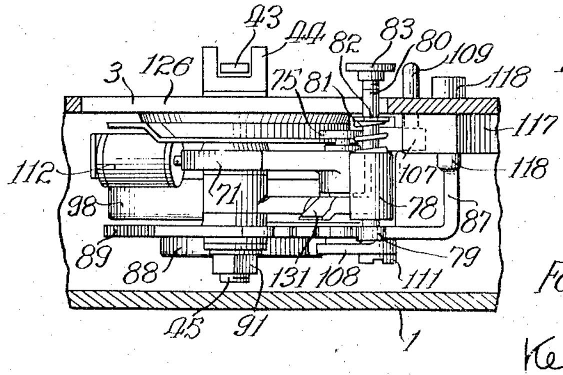
Figure 11 is a fragmentary rear elevational view taken in section substantially on line 11—11 of Figure 3.

To adjust the time during which the scrubbers 67, 67 operate upon the surface of the record 122, the operator need only push down upon the lug release knob 83 and move the drive lug 79 (Figure 11) into engagement with another one of the notches 86 in the disk 85, using the knob position marks 84 positioned along the arcuate slot 126 (Figure 1) as a guide to this time setting. This adjustment, for the reasons explained above, changes the arc through which the disk 85 is displaced before the master arm 71 automatically disengages from the drive arm 78 by the action of the lifter cam 76 described above. By decreasing this displacement, it takes a correspondingly shorter period of time for the switch arm 87 to rotate back to the position of Figure 10, and hence the actual scrubbing operation upon the record 122 will be reduced correspondingly.

In the embodiment shown, the scrubbers 67, 67 are diametrically opposed. This equal spacing of the scrubbers 67, 67 is desirable, since it provides a balanced system and equalizes the time interval between successive scrubbings of any portion of the record by the orbitally moving scrubbers 67, 67. Equal spacing of the scrubbers along their orbital path can of course be maintained where three or more scrubbing members are used. Where only one scrubbing member is used, any resultant unbalance of the bracket disk 57 or idler can be counteracted by using a counterweight.

Thus it will be seen that I have perfected apparatus which is adapted to remove minor irregularities in a highly automatic and efficient manner from a surface of a plastic or like substance soluble in volatile solvent. While I have shown and described a preferred ambodiment of my invention, it is to be understood that this embodiment has been given by way of example only and that various changes and rearrangements of the details shown herein may be made without departing from the spirit of the invention, the scope of which is defined in the appended claims.

I claim:

1. Apparatus for erasing the sound track from an annular surface area of a phonograph record disk having a center opening, said apparatus comprising a frame including an upper plate and a spindle projecting upwardly therefrom, said spindle adapted to engage said center opening in said disk, a hinge post secured to said frame member, a housing projecting from and supported by said hinge post to swing over said record disk placed on said plate, a plunger carried by said housing, said plunger being aligned with said spindle when said apparatus is in operative position, means for moving said plunger downwardly to contact and secure said record disk against rotation about said spindle, a first gear rotatable about the axis of said plunger, means for driving said first gear, a member freely rotatable about the axis of said plunger, a pair of vertical, diametrically opposed shafts carried by said member, two planetary gears, each carried by one of said shafts and each meshed with said first gear, two scrubbing members, each carried by one of said shafts and each driven rotatably through its respective planetary gear, said scrubbing members engaging opposed portions of said annular surface area, and means for introducing solvent between said scrubbing members and said record disk.

2. Apparatus of the type defined in claim 1, wherein said hinge post comprises a yoke secured to said frame, said yoke including a pair of horizontally extending arms, and a threaded shaft positioned between said arms and secured against turning, said housing having a hole therethrough internally threaded to mate with said threaded shaft, said thread being of the character whereby said housing translates downwardly as it is swung from the inoperative position toward and over said record disk, whereby said scrubbing members are brought to bear against said record disk.

3. Apparatus for removing the sound track from an annular surface area of a phonograph record disk, said apparatus comprising: a plate adapted to support and position said record disk, means for holding said disk in fixed position with respect to said plate, a first member adapted to swing over said record disk when said disk is on said plate, a rotatable member carried by said first member and adapted to bear against a portion of said sound track when said first member is swung over said disk, means for turning said rotatable member, means for introducing solvent between said rotatable member and said record disk, and other means for causing relative movement between said rotatable member and said record disk whereby said rotatable member progressively contacts said annular surface area to obliterate the sound track therefrom.

4. Apparatus for erasing the sound track from a record disk having a center opening, comprising: a frame member including a plate adapted to support said record disk, a locating pin projecting from said plate and adapted to engage said center opening, a hinge post secured to said frame member, a housing projecting from and supported by said hinge post, spring means urging said housing to swing away from said disk supporting plate, a rotatable member carried by said housing and having an orbit about the axis of said locating pin, said member adapted to contact a portion of said record disk when said housing is swung thereover, means for turning said rotatable member, means for introducing solvent between said rotatable member and said record disk, means for causing relative movement between said rotatable member and said record disk, other means for driving said rotatable member in its orbit, latch means adapted to hold said housing over said record disk, and timer control means actuated by the hinging of said housing against the resistance of said spring means.

5. Apparatus of the type defined in claim 4, wherein said timer control means comprises a shaft drivably connected to said housing and turnable therewith, a first arm secured to said shaft, a plate rotatable on said shaft, a second arm adjustable relative to said plate and drivably engaged with said first arm, a spring drivably connected to and tensioned upon rotation of said plate in one direction, means for disengaging said first arm from said second arm after said first arm has rotated in said one direction through an arc of predetermined length, said first arm continuing to rotate with said housing and adapted to engage said latch means, an escapement mechanism adapted to cooperate with said spring to rotate said plate in the opposite direction at a predetermined angular velocity, and means for releasing said latch means, said means being actuated by said plate when the latter reaches a predetermined position.

6. Apparatus for erasing the sound track from a phonographic record disk having recordings thereon, comprising: a base having a substantially planar surface adapted to support said disk, a member adapted to extend over said surface, a first rotatable gear carried by said member, means for driving said first gear, a rotatable frame concentric with said first gear, at least one gear pivotably mounted on said rotatable frame and meshed with said first gear, a substantially circular scrubbing member drivably connected to each gear and adapted to contact said disk to scrub the same, each scrubbing member having a plurality of grooves in that surface adapted to contact said disk, said grooves emanating in spiral fashion from the center of said member, and means for introducing solvent between each scrubbing member and said phonographic record disk.

7. Apparatus for erasing the sound track from a record disk, comprising: a frame including a platform adapted to support said record disk, an arm, means for hingedly securing said arm to said frame whereby said arm may be swung over said platform to the operative position, at least one member carried by said arm, each member being adapted to contact a portion of that surface of said record bearing said sound track, means for adjusting the pressure with which said member contacts said surface, means for clamping said record disk upon said platform, drive means for causing relative movement between said member and said surface, means for driving said member in an orbit concentric with said sound track, means for introducing solvent between said surface and said member, and means for automatically disengaging said member from said record disk after said sound track has been erased.

8. Apparatus of the type defined in claim 7, wherein said means for hingedly securing said arm to said frame comprises a screw threaded post secured to said frame, a portion of said arm including an internally threaded bore adapted to mate with said post, said threads being of a character such that said arm translates downwardly as it is swung from the inoperative position to the operative position, whereby said member contacts said record disk.

9. Apparatus of the type defined in claim 7, wherein said means for adjusting the pressure with which said member contacts said surface comprises spring means resisting movement of said arm away from said platform in the direction perpendicular to the axis of said hinge means, and means for adjusting the tension of said spring means.

10. Apparatus of the type defined in claim 7, wherein said means for introducing solvent between said surface and said member comprises a reservoir for said solvent, a supply line having its discharge port above said record disk, valve means in said supply line, and a solvent distributing plate between said discharge port and said record disk adapted to discharge said solvent onto said record disk just ahead of said member as the latter moves in its orbit.

11. Apparatus of the type defined in claim 7, wherein said means for clamping said record disk upon said platform includes a plunger carried by said arm and movable to contact the unused center portion of said record disk, a spring urging said plunger away from said record disk, lever means for moving said plunger into contact with said record disk against the resistance of said spring, and first latch means for holding said plunger in contact with said record disk.

12. Apparatus of the type defined in claim 11, wherein said means for automatically disengaging said member from said record disk after said sound track has been erased comprises spring means urging said arm to swing away from said platform, second latch means for holding said arm over said platform against the opposing force of said spring means, a timer mechanism energized upon movement of said arm against the resistance of said spring means, means for releasing said timer mechanism, and other means adapted to disengage said first and second latch means, said other means actuated by said timer mechanism, whereby said plunger and said arm each move away from said platform on which said record disk is positioned.

13. Apparatus for removing minor irregularities from a substantially planar surface of an article of thermoplastic or like material, comprising: means for holding said article, a member having a working surface adapted to contact at least a portion of said surface, means for placing said surfaces in abutment under pressure, means for adjusting the pressure between said surfaces, means for causing relative movement between said surfaces, and means for introducing a measured quantity of solvent between said surfaces for a predetermined period of time, said working surface being characterized by a relatively high sliding kinetic coefficient of friction when moved over said surface wetted with said solvent.

14. Apparatus for reprocessing used phonograph record disks, comprising: a table adapted to support a disk, a pivoted arm adapted to extend over said table, a rotatable member carrier by said arm, means for driving said member, a pliable facing on said rotatable member adapted to bear against said record, means for pivoting said arm to extend over a record disk supported on said table and to place said rotatable member in contact with said record disk, a reservoir adapted to contain solvent, and means for feeding said solvent to the interface between said facing and said record disk.

15. Apparatus for erasing the sound track from a record disk, comprising: a frame including a platform adapted to support said record disk, a planetary gear system including a sun gear and a planetary member having a work surface engageable with a portion of that surface of said record disk containing said sound track, means for driving said sun gear, whereby said planetary member simultaneously revolves about its own axis and in an orbit concentric with said record disk, and means for introducing a solvent between said work surface and said planetary member.

16. Apparatus for erasing the sound track from a record disk, comprising: a frame including a platform adapted to support said record disk, a member including a work surface engageable with a portion of that surface of said record disk containing said sound track, means supporting said member for rotation about an axis substantially perpendicular to said platform, means for rotating said member, said work surface of said member including a plurality of grooves which emanate in spiraling fashion from said axis and which are skewed in the same direction in which said member is rotated, and means for introducing a solvent between said member and said record disk.

FORTUNATO S. AJERO.

REFERENCES CITED

The following references are of record in the file of this patent:

UNITED STATES PATENTS

| Number | Name | Date |
|---|---|---|
| 741,047 | Klepper | Oct. 13, 1903 |
| 1,405,208 | Hails | Jan. 31, 1922 |
| 2,265,032 | Feyrer | Dec. 2, 1941 |
| 2,340,161 | Van Deventer | Jan. 15, 1944 |